United States Patent [19]

Mailey

[11] Patent Number: 5,193,933
[45] Date of Patent: Mar. 16, 1993

[54] IN SITU MODULAR FASTENING SYSTEM

[76] Inventor: John W. Mailey, 6114 Fountain Pt., Grand Blanc, Mich. 48439

[21] Appl. No.: 828,724
[22] Filed: Jan. 31, 1992
[51] Int. Cl.[5] .............................................. F16D 1/00
[52] U.S. Cl. .................................... 403/408.1; 24/453
[58] Field of Search ................ 403/408.1; 24/453, 297

[56] References Cited
U.S. PATENT DOCUMENTS 3,918,130  11/1975  Poe ........................................ 24/453
4,757,664   7/1988  Freissle ......................... 403/408.1 X

FOREIGN PATENT DOCUMENTS 185394  6/1986  European Pat. Off. ......... 403/408.1

Primary Examiner—Andrew V. Kundrat
Attorney, Agent, or Firm—Harness, Dickey & Pierce

[57] ABSTRACT

A modular fastening system which is integrally molded as part of a plastic member which is being fastened to another member is disclosed. The fastening system comprises a locking member and a movable positioning means for selectively permitting the locking member to move between locked and unlocked positions. The position means is connected to the plastic member during the molding process and easily broken away during the assembly process and positioned in the plastic member to complete the fastening process. Because the positioning means is molded as an integral part of the plastic member, no loose fasteners or additional pieces are required.

16 Claims, 2 Drawing Sheets

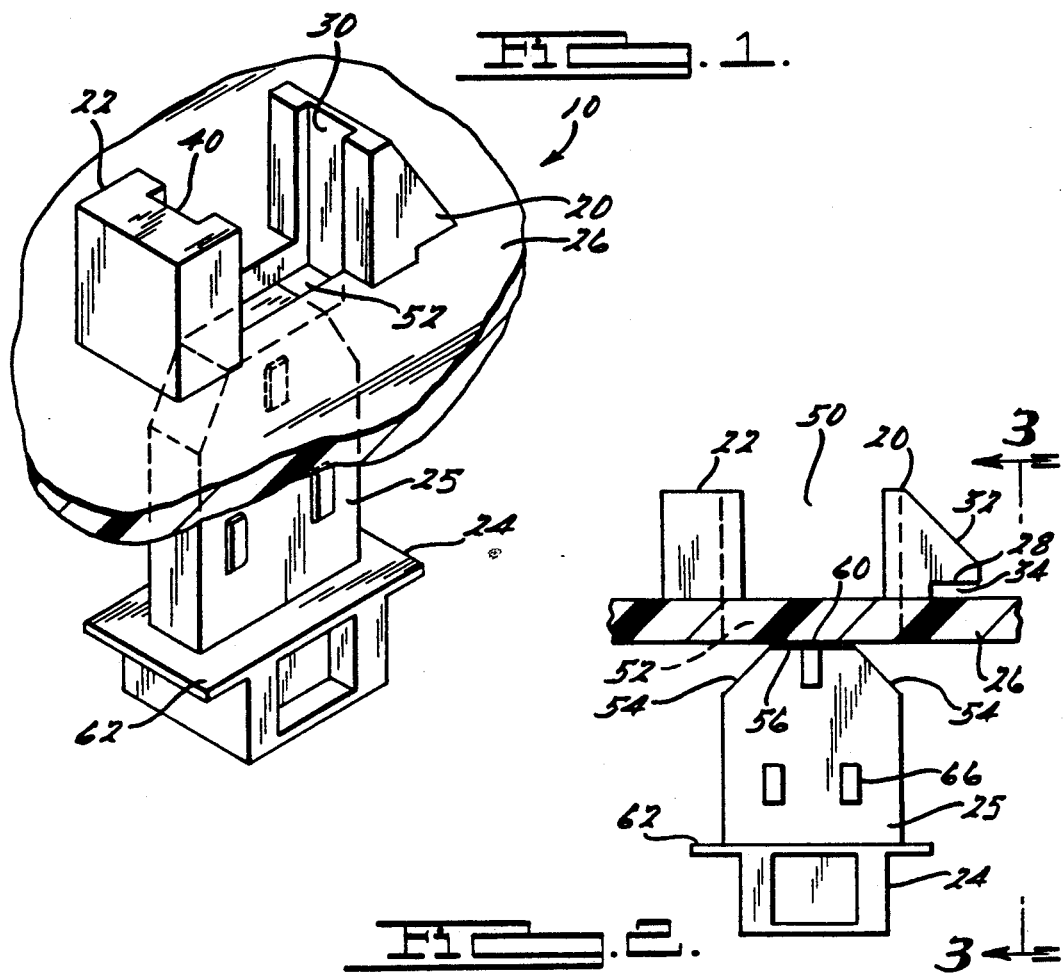
FIG. 1.
FIG. 2.
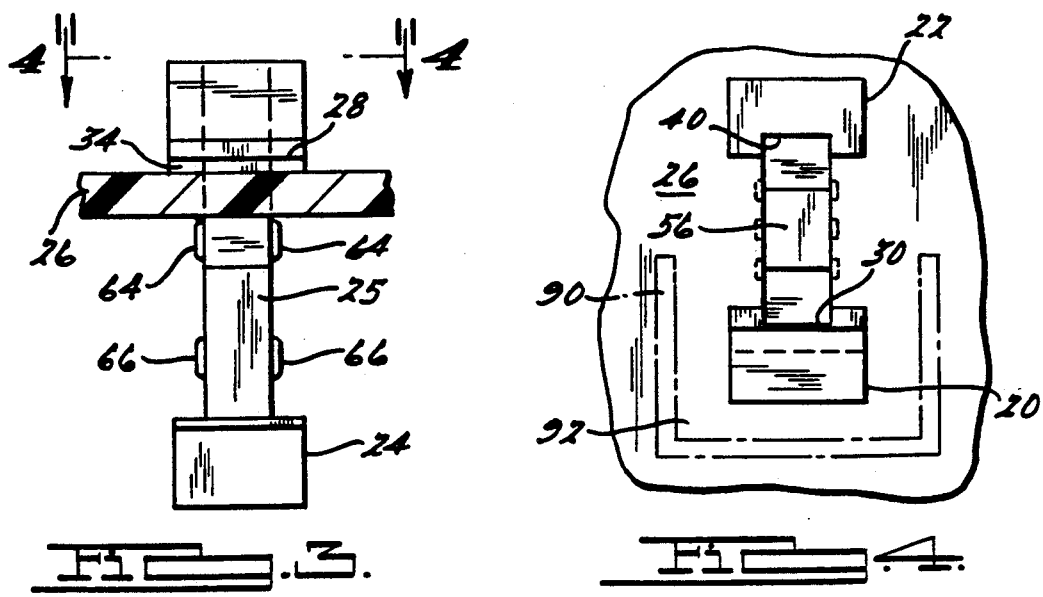
FIG. 3.
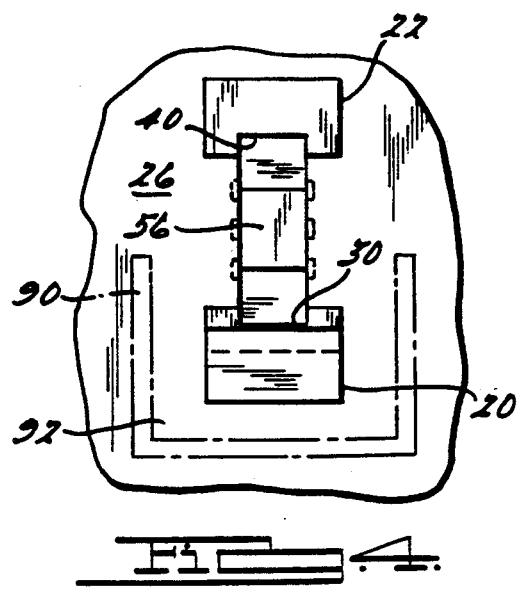
FIG. 4.

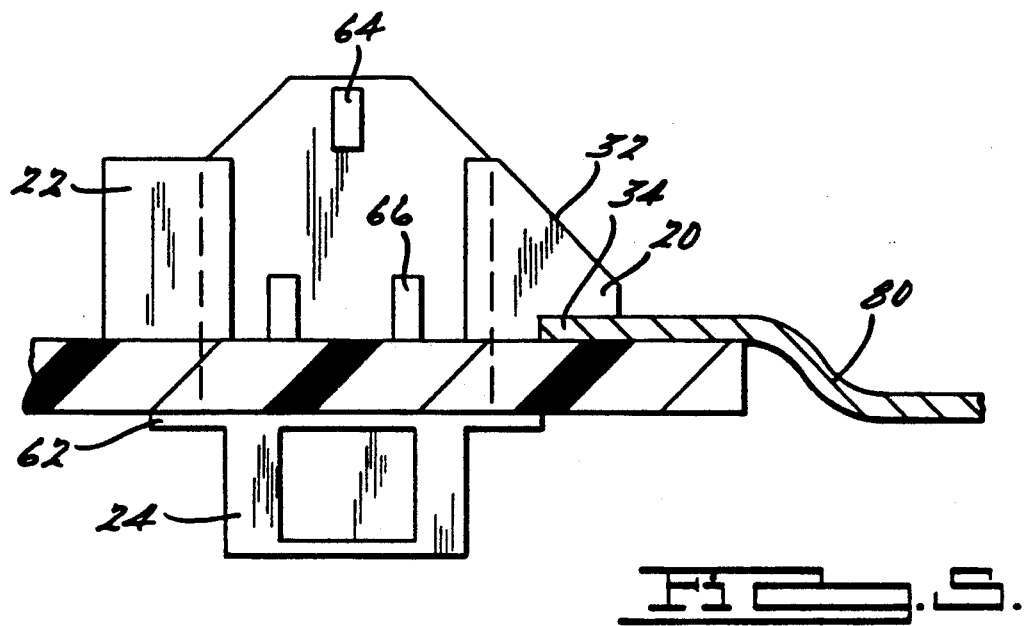
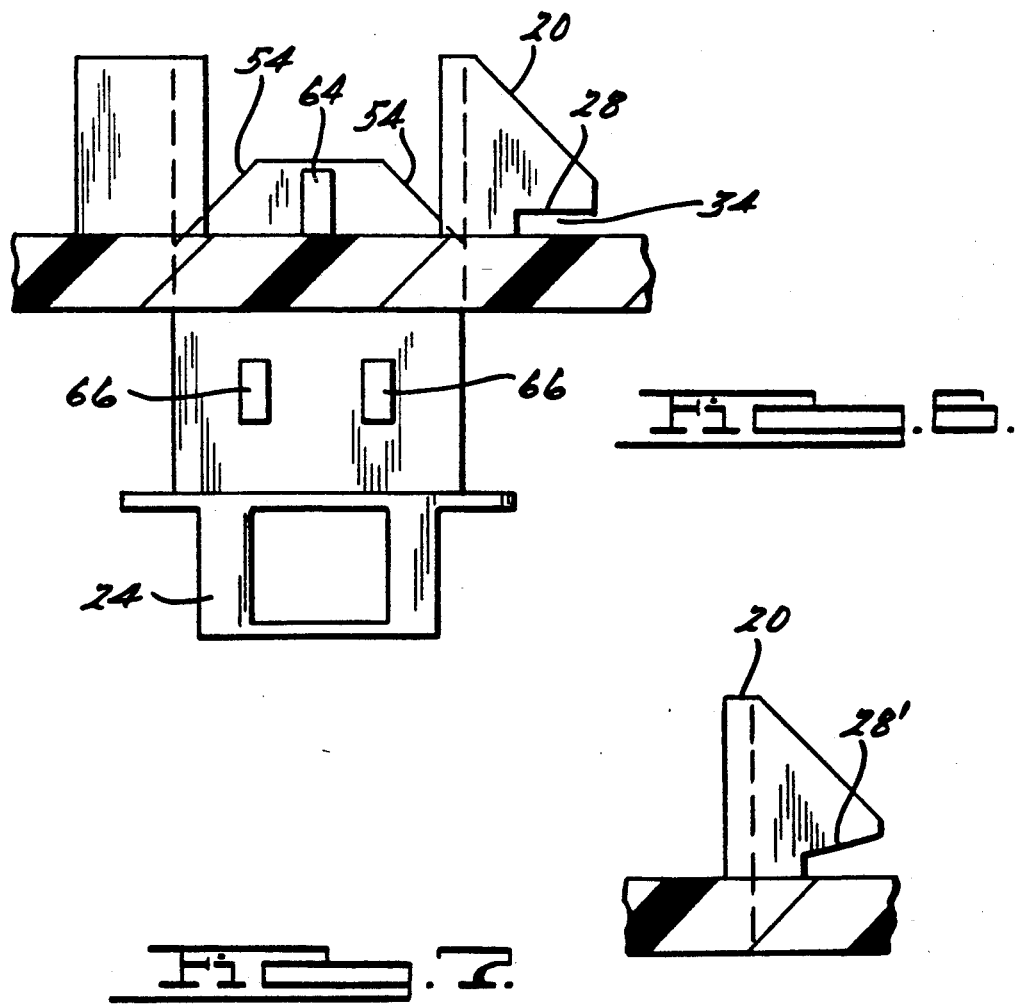

IN SITU MODULAR FASTENING SYSTEM

BACKGROUND OF THE INVENTION

The present invention relates to fasteners. More particularly, the present invention relates to a two piece plastic fastener with both pieces being integrally molded as a single unit with the part or component being fastened. While the invention relates to the fastening of virtually any plastic component to another, the applicability of the invention to the automotive industry will be highlighted as it is particularly suited for utilization herein.

The automotive industry has in recent times been going through a downsizing and/or weight reducing effort due to several factors including the energy crisis, the cost of materials, government fuel efficiency mandates and the like. A major part of this downsizing and/or weight reduction effort has been to utilize to an ever-increasing extent components made from plastic materials.

Plastic parts are normally fastened to mating components by one or more separate individual fasteners. Industry is general and the automotive industry in particular utilize a wide variety and quantity of fasteners. These fasteners are made from a variety of materials but they have traditionally been made from steel or other metals. The cost to the automotive manufacturer for maintaining an individual active part number for each fastener used is substantial. By having a wide variety of fasteners in varying sizes, each particular fastener represents a separate part number with its attendant individual costs of ordering, tracking, inventory, quality control, service, and the like.

In addition to the cost of maintaining part numbers, the quality of the attachment when individual conventional fasteners are used in questionable. Such fasteners are normally affixed and tightened by some type of fastening gun, torque wrench, nut runner, automatic screw driver or other automated tool. These tools are operated either by working on the line or they may be operated by robots. Regardless of how such conventional fasteners are fastened, there is not a reliable means for insuring that the fastening procedure has been properly completed. Therefore, a substantial number of components complete the assembly process having improperly affixed or tightened fasteners.

Accordingly, it would be desirable to provide a fastening system which is light weight, reliable and capable of reducing the number of part numbers that need to be maintained by a manufacturer utilizing the system. The fastening system should also be simple and reliable to assemble to reduce the amount of labor necessary to complete the fastening process and the incidence of misapplied fasteners.

SUMMARY OF THE INVENTION

The present invention is directed to a low cost, light weight, reliable fastening system in which the fastener is integrally molded at some time and of the same material as the plastic component it attaches. The fastener of the present invention is part of the plastic component itself. It thereby eliminates the need to match and apply particular conventional fasteners with particular components. The fastening system utilizes a living hinge that is selectively rendered inoperable by the assembler after the plastic component is fastened.

From the subsequent detailed description, appended claims and drawings, other objects and advantages of the present invention will become apparent to those skilled in the art.

DESCRIPTION OF THE DRAWINGS

FIG. 1 is a perspective view partially in cross section of a preferred embodiment of the in situ modular fastening system of the present invention prior to completion of the fastening step.

FIG. 2 is a side view of the modular fastening system of FIG. 1.

FIG. 3 is a side view of the modular fastening system taken in direction 3—3 of FIG. 2.

FIG. 4 is a view of the modular fastening system taken in direction 4—4 of FIG. 3.

FIG. 5 is a side view of the modular fastening system of FIG. 2 after the fastening process has been completed.

FIG. 6 is a side view of the modular fastening system of the present invention with the fastener in the open position.

FIG. 7 is a side view of a second embodiment of the locking member of the modular fastening system of the present invention.

DESCRIPTION OF THE INVENTION

The modular fastening system of the present invention is designated by reference numeral 10 FIGS. 1–4. The modular fastening system 10 comprises three members, a locking member 20, a support guide 22, and an anvil 24. All three of these members are manufactured as an integral part of the plastic part or component 26. Preferably, the component or part 26 is a plastic injection molded piece having the integral locking member 20, support guide 22 and anvil 24 simultaneously molded therewith. While the modular fastening system 10 can be molded from virtually any injection moldable plastic, polypropelyne acetal has been found to be a particularly suitable plastic.

In the preferred embodiment, the locking member 20 extends generally perpendicular to the part 26. The locking member 20 defines a first guiding channel 30 which also extends generally perpendicular to part 26. A camming surface 32 is located on locking member 20 opposite the first guiding channel 30. Locking member 20 further defines a retention slot 34 located between surface 28 of the locking member 20 and part 26. The portion of locking member 20 between slot 34 and first guiding channel 30 is dimensionally configured to provide a living hinge between locking member 20 and part 26. Locking member 20 is thereby permitted to flex or deflect relative to the surface of part 26 when a lateral force is applied against camming surface 32. The function of the first guide channel 30, the camming surface 32 and the slot 34 will be further described herein.

The support guide 22 extends generally perpendicular to the part 26 and generally parallel to and spaced apart from the locking member 20 as shown in FIG. 2. The support guide 22 defines a second guiding channel 40 which is generally parallel to the first guiding channel 30. As discussed, the locking member 20 and the support guide 22 are separated from each other by a predetermined distance. The first guiding channel 30 and second guiding channel 40 are opposite each other and form a guiding slot 50. The part 26 has an aperture 52 which is located between the first and second guiding channels 30 and 40 and forms an opening which allows access to the guiding slot 50 as shown in FIGS. 1 and 2.

The anvil 24 also extends generally perpendicular to the part 26 and is located during the injection molding process on the side of part 26 opposite the locking member 20 and the support guide 22. The anvil 24 comprises a plunger portion 25 that has a cross section which is substantially similar but slightly smaller than the aperture 52 in part 26. One end of plunger portion 25 has a pair of angled surfaces 54 and a flat surface 56. Upon completion of the injection molding process, the anvil 24 is generally aligned with the aperture 52 and attached to part 26 by a breakaway 60 along flat surface 56. The breakaway 60 is an amount of plastic formed during injection molding between anvil 24 and part 26 that is designed to be strong enough to maintain the position of anvil 24 during normal handling and shipping, but weak enough to be broken when completion of the assembly process is desired as will be explained later herein. A travel stop or shoulder 62 is located on the anvil opposite the angled surface 54 of plunger portion 25. The anvil also has two sets of retaining tabs 64 and 66. Upper tabs 64, one located on each side of the anvil 24, are used to maintain the positioning of the anvil within the opening 52 during assembly or disassembly of the part 26. Lower tabs 66, two tabs located on each side of the anvil 24 closer to shoulder 62, are used to maintain the positioning of the anvil 24 within the aperture 52 and guiding slot 50 after assembly has been completed.

The operation of the modular fastening system is as follows. A part 26 is provided with locking member 20, support guide 22 and anvil 24 formed as part of the plastic piece as shown in FIG. 2. The component 80 is the component to which part 26 is to be attached, in this particular instance sheet metal having a thickness of approximately 3 millimeters is shown in FIG. 5. The part 26 is attached to the component 80 by moving the part 26 towards component 80 in a direction that is generally perpendicular to component 80. As part 26 approaches component 80, camming surface 32 of locking member 20 is forced against component 80. As part 26 is moved farther towards component 80 a load is applied by the edge of component 80 to camming surface 32. This load against camming surface 32 causes the locking member 20 to deflect at the living hinge towards the support guide 22 thereby opening the slot 34 to accept the edge of component 80.

Under certain circumstances it may be desired to reduce the amount of load required to deflect the locking member 20 in order to accept component 80. In this case, a U-shaped channel 90 as shown in phantom in FIG. 4 may be molded in the part 26. The channel 90 extends completely through part 26 and forms a tab member 92. When load against the camming surface 32 is exerted, both the locking member 20 and the tab member 92 deflect to open slot 34 for accommodating component 80. Once the edge of component 80 to which part 26 is being attached is seated in the slot 34, the locking member 20 returns to its generally perpendicular position.

Either prior to or during the assembly process, anvil 24 is broken away from the part 26 by shearing the breakaway 60. The shearing of breakaway 60 can be accomplished by a twisting or bending of the anvil 24 relative to part 26 or by exerting a load against anvil 24 perpendicular to part 26 to move anvil 24 into opening 52. Once breakaway 60 has been sheared, anvil 24 is inserted through aperture 52 and into guiding slot 50. If assembly of part 26 with component 80 has already taken place, the insertion of anvil 24 through aperture 52 and into guiding slot 50 is continued until travel stop 62 is seated against part 26 as shown in FIG. 5. Retaining tabs 66 maintain anvil 24 in this position. If assembly of part 26 with component 80 has not yet taken place, the insertion of anvil 24 through aperture 52 and into guiding slot 50 is continued only until anvil 24 is oriented with respect to aperture 52 such that retaining tabs 64 are on one side of aperture 52 and retaining tabs 66 are on the other side. In this manner locking member 20 is not prevented by anvil 24 from deflecting at the living hinge to accept the edge of component 80.

When in its fully inserted position, wherein travel stop 62 is seated against the surface of part 26, anvil 24 restricts the deflecting movement of locking member 20. The edge of component 80 is secured in slot 34 and the fastening operation is complete. As shown in FIG. 5, the lower tabs 66 are now located above part 26 to aid in ensuring that the anvil 24 remains in a locked position.

When disassembly of part 26 and component 80 is desired, the anvil 24 is moved to the open position as shown in FIG. 6. The lower retaining tabs 66 are forced through aperture 52 until upper retaining tabs 66 are on one side of part 26 and lower retaining tabs 64 are on the other side in order to retain anvil 24 in aperture 52. Angled surface 54 of anvil 24 provides the necessary clearance for the locking member 20 to again deflect towards the guiding post 22 and release the edge of component 80. As an alternative embodiment, the surface 28 of the locking post 20 can be provided with an angular surface 28' as shown in FIG. 7 to aid in disassembly if desired. Reassembly of part 26 and component 80 is again possible by simply uniting the two components as previously described and moving the anvil 24 back into the locked position.

It is to be appreciated that while the anvil 24, aperture 52, guide slots 50 and guide channels 30 and 40 are shown with generally rectangular cross-sections, other cross-sectional shapes and component configurations such as circular, square, triangular and the like may also be utilized. Also, it is to be appreciated that while the locking member 20 and support guide 22 are shown to be generally perpendicular to the part 26, other angular relationships between the locking member 20 and support guide 22, and the part 26 may also be utilized.

While the above detailed description describes the preferred embodiment of the present invention, it should be understood that the present invention is susceptible to modification, variation and alteration without deviating from the scope and fair meaning of the subjoined claims.

What is claimed is:

1. An integral modular fastening system for connecting a plastic member to a frame, said fastening system comprising:

a locking member integral with and extending generally perpendicular from said plastic member and forming a slot for engaging said frame between said locking member and said plastic member, said locking member having a first angular surface and being movable between a locked position and an unlocked position;

a support member extending parallel to and spaced apart from said locking member; and means for positioning said locking member in said locked position and prohibiting said locking member from moving from said locked position towards said unlocked position; said positioning means disposed between said locking member and said support member.

2. The fastening system of claim 1 further comprising means for urging said locking member towards said locked position.

3. The fastening apparatus of claim 1 wherein said positioning means is molded as an integral part of said plastic member.

4. The fastening apparatus of claim 1 wherein said plastic member has an aperture located adjacent to said locking member; and said positioning means comprises an anvil disposed in said aperture, said anvil extending generally perpendicular to said plastic member adjacent to said locking member, and being movable from an open position to a closed position whereby said locking member can move between said locked position and said unlocked position when said anvil is in said open position and movement of said anvil from said open position to said closed position prohibits said locking member from moving from said locked position towards said unlocked position.

5. The fastening apparatus of claim 4 further comprising means for locating said anvil in said open position.

6. The fastening apparatus of claim 4 further comprising means for locating said anvil in said closed position.

7. The fastening apparatus of claim 4 wherein said locking member has a first channel extending generally parallel to said locking member for guiding said anvil.

8. The fastening apparatus of claim 4 wherein said support member is located adjacent to said aperture.

9. The fastening apparatus of claim 7 wherein said support member has a second channel extending generally parallel to said support member, whereby said second channel cooperates with said first channel for guiding said anvil.

10. The fastening apparatus of claim 4 wherein said anvil is disposed in line with said aperture in said plastic member and attached to said plastic member by a breakaway means which is broken prior to insertion of said anvil in said slot.

11. The fastening apparatus of claim 1 wherein said plastic member has a U-shaped channel which extends around said locking member and completely through said plastic member, said channel forming a deflectable tab member, such that the load necessary for said locking member to deflect between said locked position and said unlocked position is reduced.

12. A fastening apparatus for connecting a plastic member to a frame said fastening apparatus comprising:

a locking member extending generally perpendicular from said plastic member and forming a slot for engaging said frame between said locking member and said plastic member, said locking member having a first angular surface and being movable between a locked position and an unlocked position, said locking member further having a first guiding channel extending the length of and generally parallel to said locking member;

a support member spaced apart from said locking member and extending from said plastic member generally parallel to said locking member, said support member having a second guiding channel opposing said first guiding channel and extending the length of and generally parallel to said first support member;

said plastic member having an aperture extending completely through said plastic member and disposed between said first and second guiding channels; and an anvil detachably molded as an integral part of said plastic member, said anvil disposed in line with said aperture of said plastic member and said first and second guiding slots, said anvil movable from a first position to a second position such that said locking member can move between said locked position and said unlocked position when said anvil is in said first position and movement of said anvil from said first position to said second position prohibits said locking member from moving from said locked position toward said unlocked position.

13. An integral modular fastening system for connecting a plastic member to a frame, said fastening system comprising:

a locking member integral with and extending generally perpendicular from said plastic member and forming a slot for engaging said frame between said locking member and said plastic member, said locking member having a first angular surface and being movable between a locked position and an unlocked position; and means for positioning said locking member in said locked position and prohibing said locking member from moving from said locked position towards said unlocked position;

said plastic member having a U-shaped channel which extends around said locking member and completely through said plastic member, said channel forming a deflectable tab member such that the load necessary for said locking member to deflect between said locked position and said unlocked position is reduced.

14. An integral modular fastening system for connecting a plastic member having an aperture to a frame, said fastening system comprising:

a locking member adjacent to said aperture of said plastic member integral with and extending generally perpendicular from said plastic member, said locking member forming a slot for engaging said plastic member, said locking member having a first angular surface and being movable between a locked position and an unlocked position;

an anvil disposed in said aperture, said anvil extending generally perpendicular to said plastic member adjacent to said locking member, and being movable from an open position to a closed position whereby said locking member can move between said locked position and said unlocked position when said anvil is in said open position and movement of said anvil from said open position to said closed position prohibits said locking member from moving from said locked position towards said unlocked position; and a support member extending generally parallel to and spaced apart from said locking member and located adjacent to said aperture.

15. The fastening apparatus of claim 14 wherein said locking member has a first channel extending generally parallel to said support member for guiding said anvil.

16. The fastening apparatus of claim 15 wherein said support member has a second channel extending generally parallel to said support member, whereby said second channel cooperates with said first channel for guiding said anvil.

* * * * *